United States Patent [19]

Tanaka

[11] Patent Number: 5,781,740
[45] Date of Patent: Jul. 14, 1998

[54] MULTIMEDIA COMMUNICATION SYSTEM

[75] Inventor: Mitsumasa Tanaka, Tokyo, Japan

[73] Assignee: NEC Corporation, Tokyo, Japan

[21] Appl. No.: 597,191

[22] Filed: Feb. 6, 1996

[30] Foreign Application Priority Data

Feb. 6, 1995 [JP] Japan ................................. 7-017592

[51] Int. Cl.[6] .............................. G06F 13/00; G06F 11/30
[52] U.S. Cl. .................................. 395/200.59; 395/200.33
[58] Field of Search ......................... 395/200.33, 200.58,
395/200.49, 200.32, 200.53, 200.54, 200.55,
200.56, 200.31, 200.59, 674; 348/7

[56] References Cited

U.S. PATENT DOCUMENTS 5,459,871  10/1995  Van Den Berg ........................ 395/674

FOREIGN PATENT DOCUMENTS

| 0 316 250 A3 | 5/1989 | European Pat. Off. . |
| 61-270946 | 12/1986 | Japan . |
| 63-244989 | 10/1988 | Japan . |
| 2-288540 | 11/1990 | Japan . |
| 4-38087 | 2/1992 | Japan . |
| WO 93/15457 | 8/1993 | WIPO . |

OTHER PUBLICATIONS

"HP Task Broker: A Tool for Distributing Computational Tasks," by Terrence P. Graf et al., Hewlett–Packard Journal, 44 (1993) Aug., No. 4, Palo Alto, California, pp. 15–22.

"The System Architecture of the Heidelberg Transport System," by Lars C. Wolf et al., Operating Systems Review (SIGOPS) 28 (1994) Apr., No. 2, New York, U.S., pp. 51–64.

*Primary Examiner*—Mark H. Rinehart
*Attorney, Agent, or Firm*—Sughrue, Mion, Zinn, Macpeak & Seas, PLLC

[57] ABSTRACT

In order to serve, to each of client terminals, programs and data most suitable for performance of the terminal, a server station of a mul-timedia communication system of the invention sends a check program before delivering data called from the client terminal.

The terminal performs certain calculations and graphic display according to the check program and reports times needed for the check program to the server station.

The server station selects programs and data most suitable for the terminal, enabling the terminal to enjoy its high performance.

7 Claims, 6 Drawing Sheets

F I G. 1
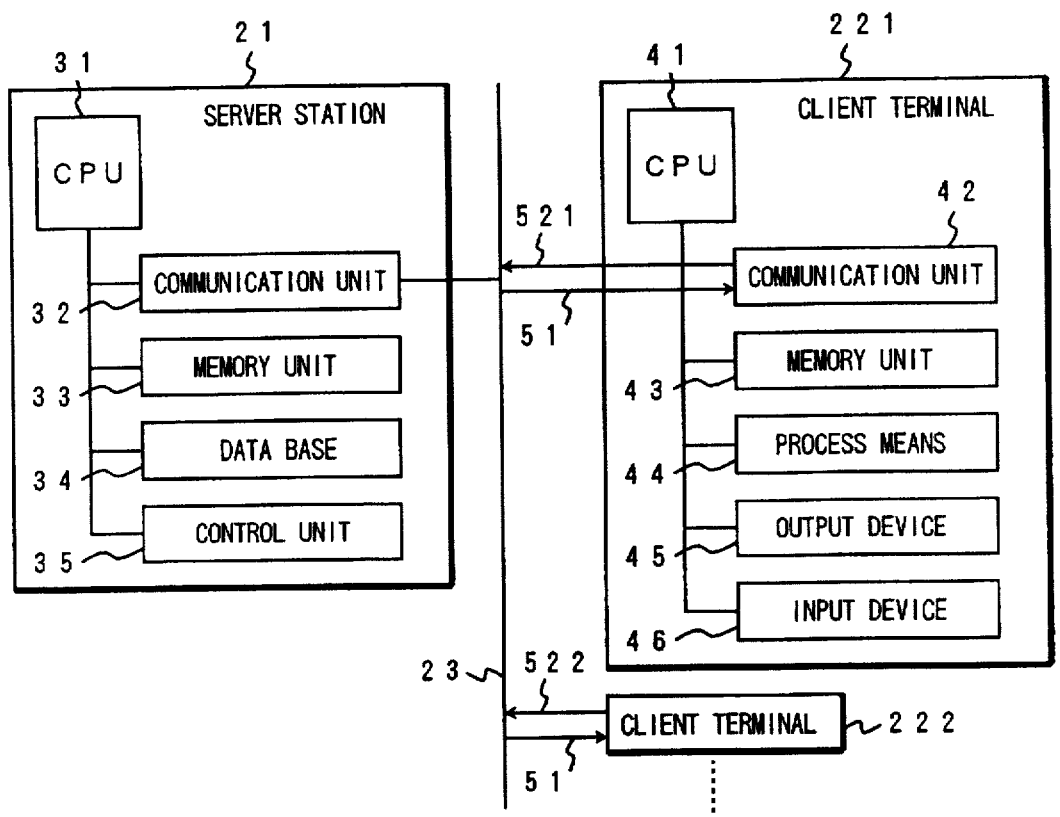
F I G. 2
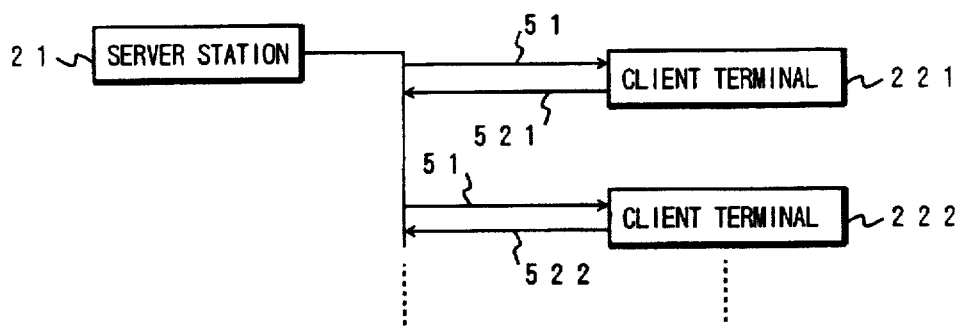

|  | "1" | "2" | "3" |
|---|---|---|---|
| CPU | 1~50 | 51~100 | 101~ |
| GRAPHIC | 1~50 | 51~100 | 101~ |

UNIT: ms (PERFORMANCE TABLE)

|  | "1" | "2" | "3" |
|---|---|---|---|
| PROGRAM | Prog "1" | Prog "2" | Prog "3" |
| DATA | Data "1" | Data "2" | Data "3" |

(ENTRY TABLE)

(MENU)

(GENRE SELECTION)

(TITLE SELECTION)

(SELECTED VIDEO DRAMA)

MULTIMEDIA COMMUNICATION SYSTEM

BACKGROUND OF THE INVENTION

This invention relates to a multimedia communication system with bi-directional transmission cable for multimedia service as video data delivering.

In a conventional CATV system for personal service, client terminals can only receive services provided from a server station. FIG. 13 illustrates a unidirectional communication system as the CATV system, where a server station 11 delivers one way services 13 of programs and data to client terminals 121, 122, . . . So, these terminals can not receive but services 13 prepared by the service station 11 impartially for all client terminals.

A bi-directional CATV system is proposed in a Japanese patent application laid open as a provisional publication No. 244989/'88, where a client terminal sends answer data beforehand prepared according to an inquiry number delivered by the center unit, or the server station, in response to a return command from the center unit indicating to return the answer data. So, time intervals for each client terminal to prepare the answer data can be eliminated, enlarging a flexibility of the CATV system for drawing up a program.

There is a remote-lecturing system disclosed in a Japanese patent application laid open as a provisional publication No. 288540/'90, wherein an audiovisual input-output device is provided in each of attendance rooms and a lecture room. In the lecture room, there are further provided means for designating a questioner and means for editing and synthesizing audiovisual data of the lecturer and the questioner, while means for asking questions and means for analyzing the synthesized audiovisual data are provided for the attendance rooms. In the system, the audiovisual data are as well displayed in other attendance rooms as in the questioner's attendance room.

An automatic channel setting apparatus for a CATV receiver disclosed in a Japanese patent application laid open as a provisional publication No. 38037/'92 changes the receiving channel of the CATV receiver into a channel selected by a user of the servicing channels, dispatching a select command to a hub-station for receiving the channel.

Besides these prior arts, there is a proposal for improving efficiency of data transmission between a client terminal and a server station. In a Japanese patent application laid open as a provisional publication No. 270946/'86, poling data from the server station to the client terminals are sorted into two types of data, that is, data to be replied and data not to be replied. By sending out the data to be replied and the data not to be replied alternately and sequentially, the data transmission efficiency, and so, operating efficiency of the system are improved.

In these prior arts, however, data of a same type are delivered for all client terminals without considering differences between performances of client terminals even in bi-directional communication systems, as a matter of course in the unidirectional communication system. So, client terminals of high performance can not enjoy their performance.

SUMMARY OF THE INVENTION

Therefore, a primary object of the present invention is to provide a multimedia communication system which can deliver service programs or service data according to performance of each client terminal making use of bi-directional transmission.

In order to achieve the object, a multimedia communication system of the present invention comprises:

client terminals, at least one of said client terminals having means for informing CPU performance and graphic performance thereof to a server station; and means provided in said server station for delivering, to each of said client terminals, programs and data most suitable for CPU performance and graphic performance of said each of said client terminals among programs and data called from said each of said client terminals in case said each of said client terminal has said means for informing CPU performance and graphic performance.

Therefore, client terminals of high performance in the multimedia communication system of the invention can fully enjoy their performances.

BRIEF DESCRIPTION OF THE DRAWINGS

The foregoing, further objects, features, and advantages of this invention will become apparent from a consideration of the following description, the appended claims, and the accompanying drawings in which the same numerals indicate the same or the corresponding parts.

FIG. 1 illustrates outline of a multimedia communication system of an embodiment of the present invention.

FIG. 2 shows a principal operation of the multimedia communication system of FIG. 1.

DETAILED DESCRIPTION OF THE PREFERRED EMBODIMENTS

Figures 3, 4, 5:
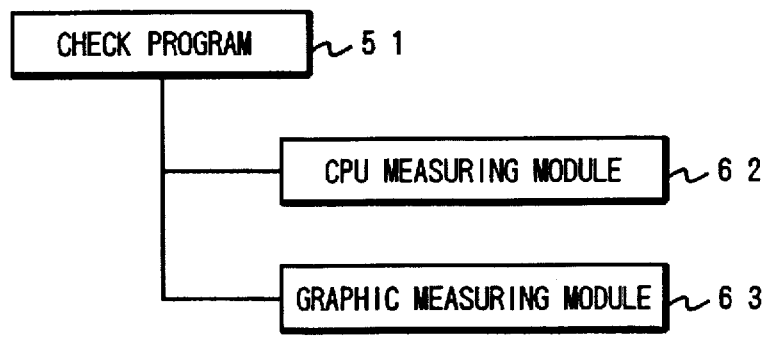
FIG. 3 shows modules of a check program 51.
FIG. 4 shows an example of a performance table 71 prepared in the memory 33 of the server station 21 shown in FIG. 1.
FIG. 5 shows an example of an entry table 81 prepared in the memory 33 corresponding to the performance table 71 of FIG. 4.

FIG. 1 illustrates outline of a multimedia communication system of an embodiment of the present invention. This system is composed of a server station 21, client terminals 221, 222, . . ., and bi-directional transmission cable 23.

The server station 21 has a CPU 31 as a control center which performs various controls according to programs prescribed. The CPU 31 is provided with a communication unit 32 for controlling bi-directional communication with the client terminals 221, 222, . . . through the transmission cable 23, a memory unit 33 for storing service programs, service data, check programs and so on, a data-base 34 for looking up a kind of the service programs or the service data most suitable for each client terminal according to its performance relating to a kind of its micro-processor or its clock frequency, for example, and a control unit 35 for verifying ID numbers of the client terminals or controlling the database 35.

In a client terminal 221, there are provided also a CPU 41 connected with a communication unit 42 for controlling bi-directional communication with the server station 21, a memory unit 43 for storing its ID number, programs, data and so on, process means 44 for processing service programs or check programs, an output device 45 for displaying data processed according to a service program, and an input device for receiving various indications from a user. Other client terminals 222, ... have a same composition with the client terminal 221, but performance of each unit, a processing speed of the CPU or the memory capacity for example, may differ.

FIG. 2 shows a principal operation of the multimedia communication system of FIG. 1. The server station 21 delivers a check program 51 to each of the client terminals 221, 222, ... for measuring calculation speed of their CPU 41 for certain formulas and displaying speed to its output device 45 for certain graphic data. Each of the client terminals 221, 222, ... returns response data 521, 522, ... composed of its ID number and the measured data to the server station 21.

FIG. 3 shows modules of the check program 51. The check program 51 is composed of a CPU measuring module 62 for checking calculation speed of certain formulas of the CPU 41 and a graphic measuring module 63 for checking displaying speed of certain graphic data to the output device 45.

FIG. 4 shows an example of a performance table 71 prepared in he memory 33 of the server station 21, which classifies the CPU performance and the graphic performance into three ranks respectively according to their speed. When it takes 20 ms for a client terminal to perform the CPU measuring module 62 and 150 ms to perform the graphic measuring module 63, the client terminal is classified to 1–3, for example.

FIG. 5 shows an example of an entry table 81 prepared in the memory 33 corresponding to the performance table 71, where programs and data are registered in fields corresponding to the performance ranks of the performance table 71 most suitable for the program or the data.

Figure 6:
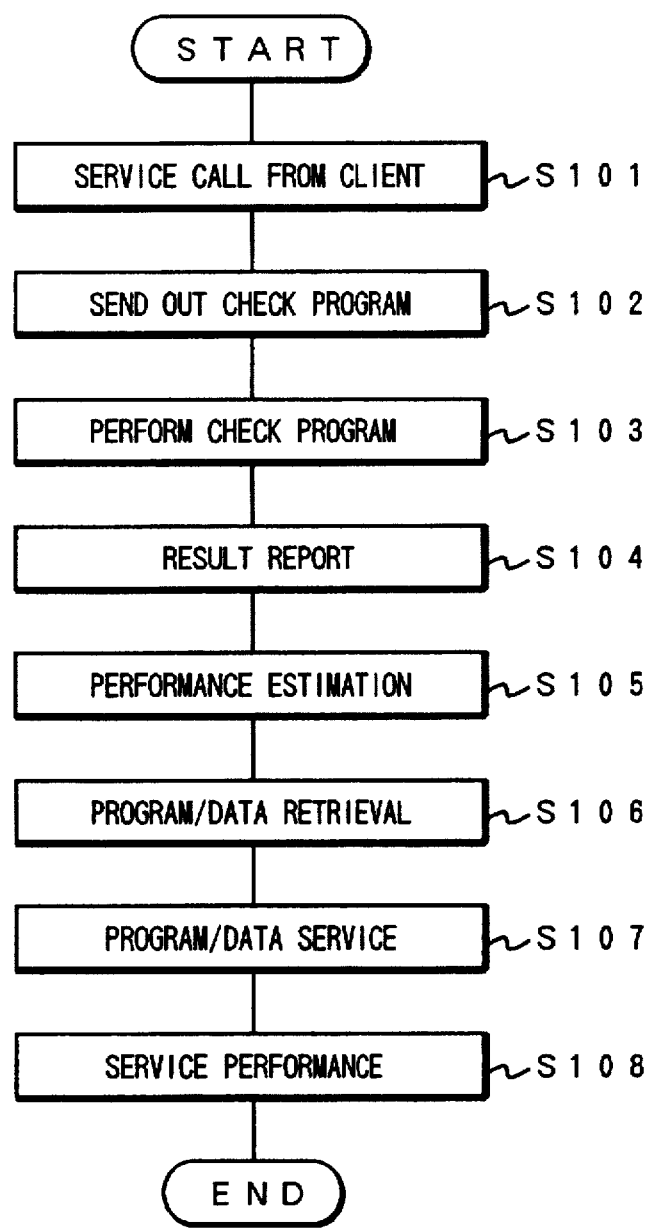
FIG. 6 shows processes in the multimedia communication system of FIG. 1.

Processes from a service call to the start of the service in the multimedia communication system above described are shown in FIG. 6. In step S101, a client terminal 221 calls a service to the server station 21, which sends the check program 51 to the client terminal 221 in step S102.

Receiving the check program 51, the client terminal 221 performs it in step S103. Results of the check program are returned as the response data 521 to the server station 21 (step S104), which estimates the performance of the client terminal 221 referring to the performance table 71 of FIG. 4. Then the server station 21 looks up a service program and service data most suitable for the client terminal 221 in step S106 referring to the entry table 81 of FIG. 5 with the estimated performance. Then the service program and the service data are sent to the client terminal 221 in step S107 and performed in step S108. Thus, the client terminal 221 can be served with a program and data the most suitable for its performance.

Figure 7:
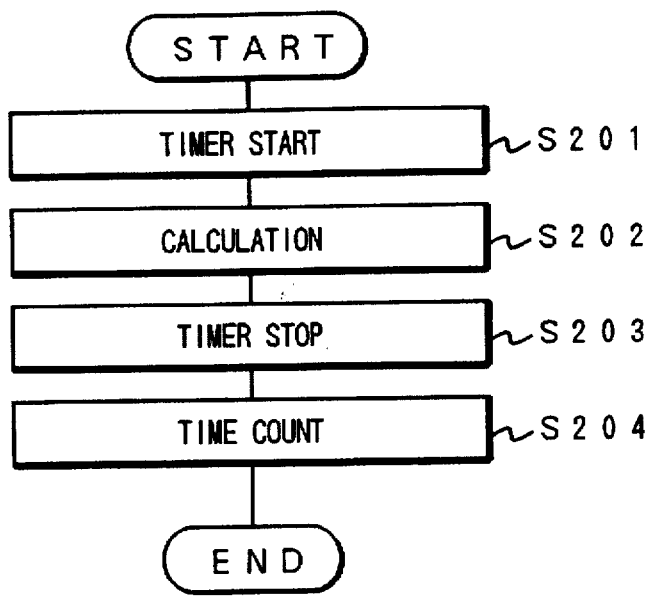
FIG. 7 is a flow chart of the processes performed in the CPU measuring module 62 shown in FIG. 3.

FIG. 7 is a flow chart of the processes performed in the CPU measuring module 62. Receiving the module 62, the CPU 41 starts a timer in step S201 and executes several kinds of calculations prepared in the process means 44 (step S202). The timer stops at the end of the calculations (step S203) and a time interval or a calculation speed is counted by the CPU 41 in step S204. Here, the kinds of calculations are so determined as to give an appropriate result for estimating the ability of the CPU to perform high grade programs including various functions for realizing high visual effects.

Figure 8:
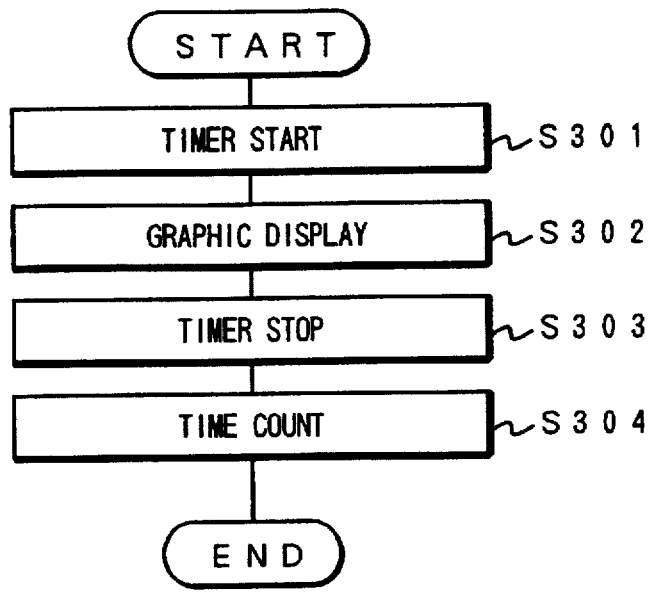
FIG. 8 is a flow chart of the processes performed in the graphic measuring module 63 shown in FIG. 3.

FIG. 8 is a flow chart of the processes performed in the graphic measuring module 63. Receiving the module 63, the CPU 41 starts a timer in step S301 and displays several kinds of graphic data to the output device 45 (step S302). The timer stops at the completion of the graphic display (step S303) and a time interval or a displaying speed is counted by the CPU 41 in step S304. A client terminal with the higher displaying speed of graphic data can display video data of the higher resolution or the finer color tone realizing the higher visual effects.

FIGS. 9 to 12 illustrate an example of a sequence of pictures displayed on a client terminal when it selects a video drama performing a service program delivered from the server station. In a menu picture 91 shown in FIG. 9, there are displayed a video service button (a pictogram or an icon) 92 for selecting a video drama, a TV service button 93 for selecting a TV broad cast and a game service button 94 for selecting a game service. A user selects one of the buttons by a pointing device (which is not shown in FIGs) or another input device. Assume that the video button 92 is selected here.

Figure 9:
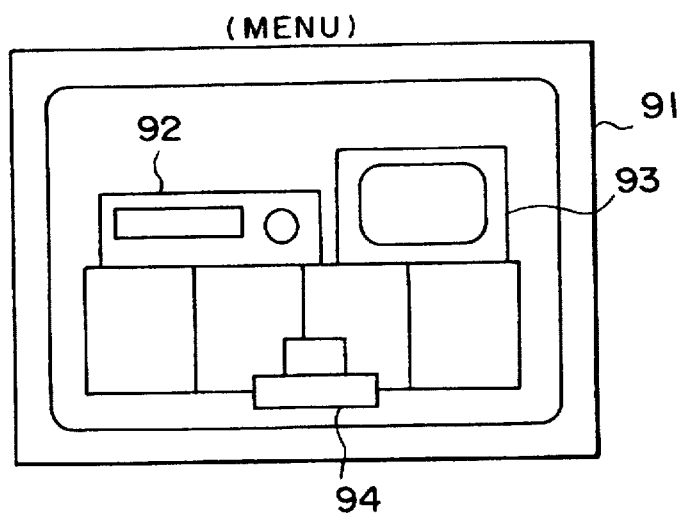
FIG. 9 illustrates an example of a menu picture 91.
Figure 10:
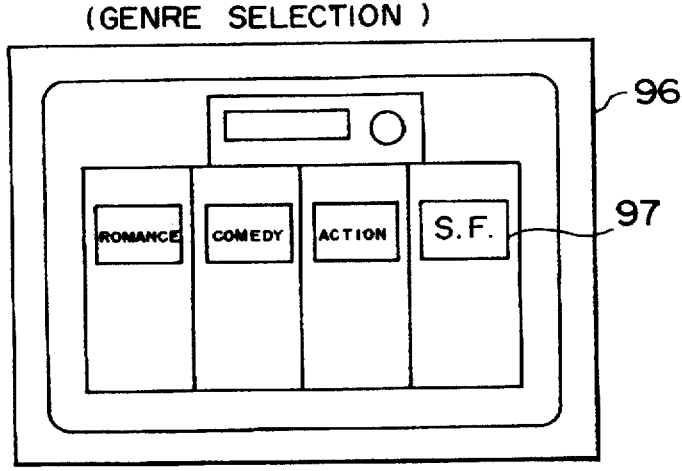
FIG. 10 illustrates a picture 96 displayed after the video button 92 in the menu picture 91 is selected.
Figure 11:
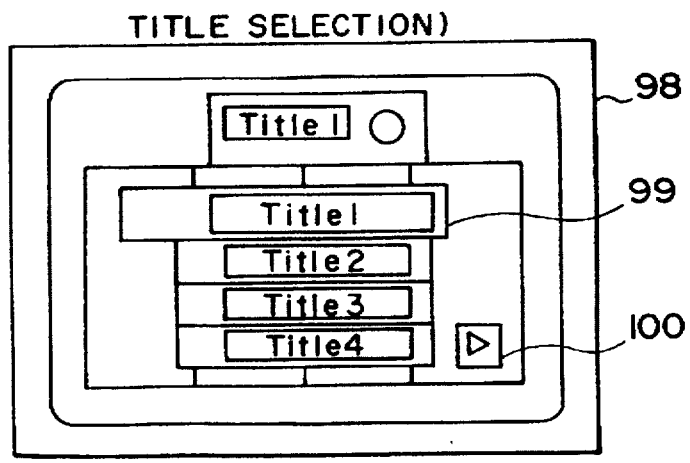
FIG. 11 illustrates a picture 98 for designating a title of a video drama of the genre selected on the picture 96.
Figure 12:
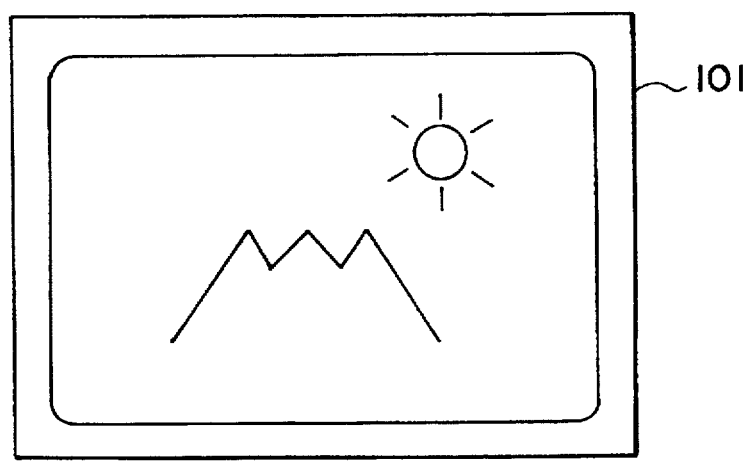
FIG. 12 illustrates an example of a video drama selected on the picture 98.
Figure 13:
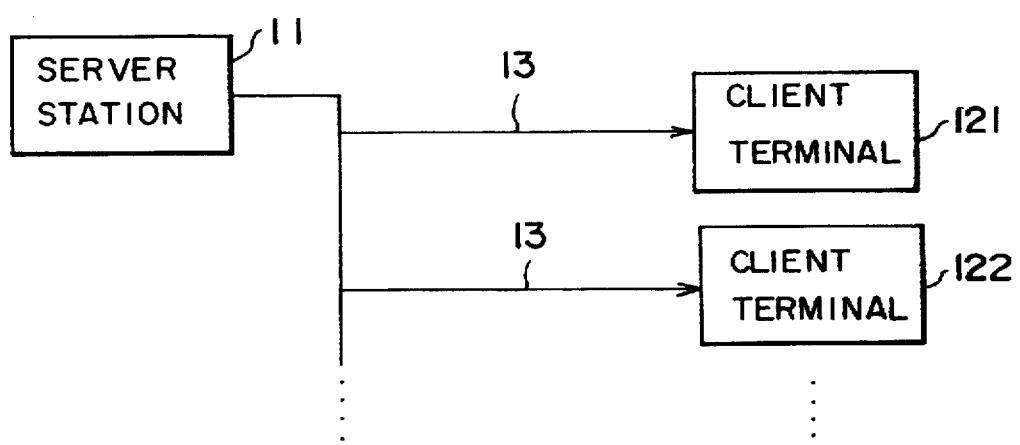
FIG. 13 is a block diagram illustrating a prior art.

FIG. 10 is a picture 96 displayed after the video button 92 is selected, wherein a part around the video button of the picture 91 shown in FIG. 9 is enlarged into the picture 96 displaying buttons for selecting a genre of video drama among a romance, a comedy, etc. FIG. 11 is a picture 98 for designating a title of a video drama of the selected genre. The user selects one of the title buttons 99 displayed on the picture 98 and points a play button 100. Thus, a video drama of the selected title is displayed on a picture 101 as illustrated in FIG. 12.

In the embodiment of the invention, the display mode of the pictures described can be arranged according to the performance of the client terminal. For a client terminal of high performance, a service program of high visual effects using various functions as a picture size deformation or rotation, for example, is delivered, while a simple program which does not make users await unnecessarily by displaying text data, for example, is delivered for a client terminal of low performance.

Heretofore, an embodiment is described wherein the check program 51 is delivered each time when a client terminal calls a service for the server station 21. However, the invention is not limited in the scope, of course. The check program 51 may be performed only at first access of a client terminal to the server station 21 after the connection is established between them.

Further, the CPU performance is estimated by a total calculation time needed for certain formulas in the embodiment described, but CPUs of different types have their own different characteristics for certain types of formulas. So, by measuring calculation times for formulas of different types separately, the server station 21 may estimate the type and speed of the CPU 41 for selecting a service program and data most suitable for the CPU 41. The same concept can be applied for the graphic performance. By measuring displaying speeds of graphic data of different types separately, the server station may estimate a display mode most suitable for the client terminal.

What is claimed is:

1. A multimedia communication system comprising:

a plurality of client terminals, at least one of said client terminals having means for informing a server station of said at least one client terminal's CPU performance; and means provided in said server station for delivering, to each of said client terminals with said informing means, data most suitable for each of said client terminals with said informing means, based on each of said client terminal's CPU performance, among data called from each of said client terminals.

2. A multimedia communication system comprising:

a plurality of client terminals, at least one of said client terminals having means for informing a server station of said at least one client terminal's graphic displaying performance; and means provided in said server station for delivering, to each of said client terminals with said informing means, data most suitable for each of said client terminals with said informing means, based on each of said client terminal's graphic displaying performance, among data called from each of said client terminals said each of said client terminals has said means for.

3. A multimedia communication system recited in claim 1 or claim 2, wherein said data most suitable comprise program data for processing served data.

4. A multimedia communication system recited in claim 1, characterized in that data for checking performance of a client terminal are sent to said client terminal before delivering data called from said client terminal.

5. A multimedia communication system recited in claim 4, wherein:

said means for informing said server station of said client terminal's CPU performance informs said server station of a time needed for calculating certain formulas according to said data for checking; and said means provided in said server station for delivering data selects and delivers data of a kind, among kinds of data prepared in said server station, to said client terminal based on said time needed for calculating certain formulas.

6. A multimedia communication system recited in claim 2, characterized in that data for checking performance of a client terminal are sent to said client terminal before delivering data called from said client terminal.

7. A multimedia communication system recited in claim 6, wherein:

said means for informing said server station of said client terminal's graphic displaying performance informs said server station of a time needed for displaying certain graphic data according to said data for checking; and said means provided in said server station for delivering data selects and delivers data of a kind, among kinds of data prepared in said server station, to said client terminal based on said time needed for displaying certain graphic data.

* * * * *